(12) United States Patent
Mathew et al.

(10) Patent No.: US 9,978,076 B2
(45) Date of Patent: May 22, 2018

(54) LOCATION-BASED CROWDSOURCED FUNDS

(71) Applicant: PAYPAL, INC., San Jose, CA (US)

(72) Inventors: Sujit Mathew, Singapore (SG); Vinay Ravindra Kamath, Singapore (SG)

(73) Assignee: PAYPAL, INC., San Jose, CA (US)

( * ) Notice: Subject to any disclaimer, the term of this patent is extended or adjusted under 35 U.S.C. 154(b) by 75 days.

(21) Appl. No.: 14/260,773

(22) Filed: Apr. 24, 2014

(65) Prior Publication Data

US 2015/0310470 A1    Oct. 29, 2015

(51) Int. Cl.
| | |
|---|---|
| G06Q 40/00 | (2012.01) |
| G06Q 30/02 | (2012.01) |
| G06Q 20/10 | (2012.01) |
| G06Q 40/02 | (2012.01) |
| G06Q 20/32 | (2012.01) |

(52) U.S. Cl.
CPC ......... G06Q 30/0215 (2013.01); G06Q 20/10 (2013.01); G06Q 20/3224 (2013.01); G06Q 40/025 (2013.01)

(58) Field of Classification Search
CPC ...................................... G06Q 40/06
See application file for complete search history.

(56) References Cited

U.S. PATENT DOCUMENTS

| | | | |
|---|---|---|---|
| 2006/0259957 A1 | 11/2006 | Tam et al. | |
| 2010/0039314 A1* | 2/2010 | Gupta | G01S 5/0072 342/357.31 |
| 2010/0100469 A1* | 4/2010 | Buchanan et al. | 705/35 |
| 2012/0254304 A1 | 10/2012 | Anbalagan et al. | |
| 2012/0290467 A1* | 11/2012 | Shenkar | G06Q 50/01 705/38 |
| 2013/0018777 A1 | 1/2013 | Klein | |
| 2013/0124432 A1* | 5/2013 | Thibodeau | 705/36 R |
| 2013/0132169 A1* | 5/2013 | Dooley | G06Q 30/00 705/14.1 |
| 2013/0185228 A1* | 7/2013 | Dresner | 705/36 R |
| 2013/0311500 A1* | 11/2013 | Milone et al. | 707/758 |
| 2013/0318005 A1* | 11/2013 | Bass et al. | 705/36 R |
| 2014/0012780 A1* | 1/2014 | Sanders | G06Q 40/06 705/36 R |
| 2014/0032394 A1 | 1/2014 | Liberty et al. | |
| 2014/0052668 A1* | 2/2014 | Cameron | G06Q 40/06 705/36 R |

OTHER PUBLICATIONS

International Search Report and Written Opinion, dated Jul. 7, 2015, 10 pages, PCT Application No. PCT/US2015/022568.

* cited by examiner

*Primary Examiner* — Bruce I Ebersman
*Assistant Examiner* — Mark Gaw
(74) *Attorney, Agent, or Firm* — Haynes & Boone, LLP (57) ABSTRACT

Methods and systems for providing cash using crowdsourcing are described. A requestor sends a request for cash, and the request is relayed to a plurality of lenders in the vicinity of the requestor. The requestor is matched with a lender based on certain criteria. After the exchange of cash is confirmed, the lender may be given a reward, such as cash, coupons, a good rating, and/or virtual points.

20 Claims, 3 Drawing Sheets

FIG. 1

LOCATION-BASED CROWDSOURCED FUNDS

BACKGROUND

Field of the Invention

The present invention generally relates to the use of crowdsourcing to provide cash to an individual.

Related Art

People can find themselves stuck in a place with no friends, no cash, and no ATM nearby. Most people, however, still have their smartphones, which can provide them with access to a network. Thus, it would be beneficial to provide systems and methods that allow a user to use their mobile device to obtain cash.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that provide cash to a user with the help of crowdsourcing. Crowdsourcing is related to obtaining services, products, or ideas by soliciting contributions from a large group of people. Crowdsourcing schemes may be employed for a variety of tasks, such as fund raising and product development. Crowdsourcing systems typically provide information describing tasks and, for each task, state a reward. A user who performs the task is granted the reward.

In various embodiments, a requestor needs help and sends a request for cash. This request is relayed to lenders within the requestor's vicinity. Anyone near the requestor can respond to the request and provide help. When the requestor and a lender are matched, directions regarding how to reach the requestor can be provided to the lender, or vice versa. The requestor and lender meet and exchange cash, the transaction is confirmed, and the lender may be given a reward. Thus, a connection is made between people asking for help and those willing to help. Recommendations and other functionality can be provided to provide the "best" selection of lenders for the requestor, including providing trustworthy lenders (e.g., directly or indirectly known to the requestor, trusted by a service provider), incentivizing lenders based on the requestor (such as urgency of request, location of requestor, etc.), and finding lenders that are able to meet the request in the shortest amount of time.

Figure 1:
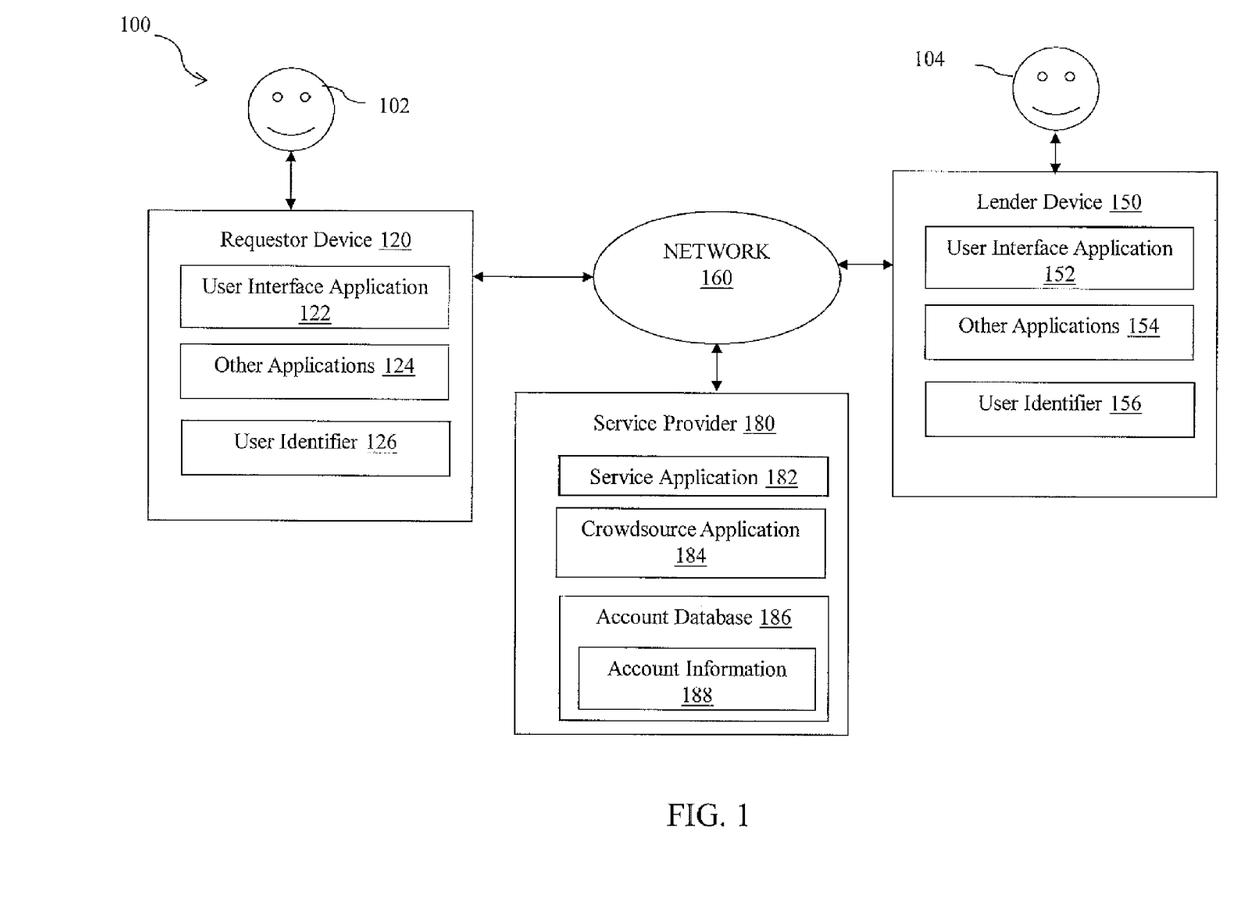
FIG. 1 is a block diagram illustrating a system for providing cash to a user according to an embodiment of the present disclosure.

FIG. 1 shows one embodiment of a block diagram of a network-based system 100 adapted to provide a user with cash. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a requestor device 120 (e.g., a smartphone), a lender device 150 (e.g., a smartphone) and at least one service provider server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The requestor device 120 and lender device 150, in one embodiment, may be utilized by the requestor 102 and the lender 104 to interact with the service provider server 180 over the network 160. For example, requestor 102 and lender 104 may conduct financial transactions (e.g., account transfers) with the service provider server 180 and with each other via the devices 120 and 150.

The requestor device 120 and lender device 150, in various embodiments, may be implemented using any appropriate combination of hardware and/or software configured for wired and/or wireless communication over the network 160. The requestor device 120, in one embodiment, may be utilized by the requestor 102 to interact with the service provider server 180 and/or the lender device 150 over the network 160. For example, the requestor 102 may conduct financial transactions (e.g., account transfers, bill payment, etc.) with the service provider server 180 via the requestor device 120. The lender device 150, in turn, may be used by the lender 104 to interact with the service provider server 180 and/or the lender device 150. In various implementations, the devices 120, 150 may include a wireless telephone (e.g., cellular or mobile phone), a tablet, a wearable computing device, a personal computer, a notebook computer, and/or various other generally known types of wired and/or wireless computing devices.

The requestor device 120, in one embodiment, includes a user interface application 122, which may be utilized by the requestor 102 to conduct transactions (e.g., shopping, purchasing, bidding, etc.) with the service provider server 180 over the network 160. In one aspect, purchase expenses may be directly and/or automatically debited from an account related to the requestor 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

The requestor device 120, in various embodiments, may include other applications 124 as may be desired in one or more embodiments of the present disclosure to provide additional features available to the requestor 102. In one example, such other applications 124 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

In various implementations, a user profile may be created using data and information obtained from cell phone activity over the network 160. Cell phone activity transactions may be used by the service provider server 180 to create at least one user profile for the requestor 102 based on activity from the requestor device 120 (e.g., cell phone), and for the lender 104 based on activity from the lender device 150. The user profile may be updated with each financial and/or information transaction (e.g., payment transaction, purchase transaction, etc.) achieved through use of the devices 120 and 150. In various aspects, this may include the type of transaction and/or the location information from the devices 120 and 150. As such, the profile may be used for recognizing patterns of potential fraud, setting transaction limits on the user, etc.

The requestor device 120, in one embodiment, may include at least one user identifier 126, which may be implemented, for example, as operating system registry entries, cookies associated with the user interface application 122, identifiers associated with hardware of the first mobile device 120, or various other appropriate identifiers. The user identifier 126 may include one or more attributes related to the requestor 102, such as personal information related to the requestor 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the requestor 102 with a particular user account maintained by the service provider server 180.

Lender device 150 may have similar applications and modules as requestor device 120. Lender device 150 may also include a user interface application 152 and one or more other applications 154 which may be used, for example, to provide a convenient interface to permit lender 104 to browse information over network 160. For example, in one embodiment, user interface application 152 may be implemented as a web browser configured to view information available over the Internet and communicate with service provider server 180.

Lender device 150 may further include other applications 154 such as security applications for implementing client-side security features, programmatic client applications for interfacing with appropriate application programming interfaces (APIs) over network 160, or other types of applications. Applications 154 may also include email, text, IM, and voice applications that allow lender 104 to communicate through network 160, and create and manage funding sources. Lender device 150 includes one or more user identifiers 156 which may be implemented, for example, as operating system registry entries, cookies associated with user interface application 152, identifiers associated with hardware of lender device 150, or other appropriate identifiers, such as used for payment/recipient/device authentication, e.g., the phone number associated with lender device 150. Identifiers may be used by a service provider to associate lender 104 with a particular account maintained by the service provider.

Requestor device 120 and lender device 150, in one embodiment, each include a geo-location component adapted to monitor and provide an instant geographical location (i.e., geo-location) of the devices 120 and 150. In one implementation, the geo-location of the devices 120, 150 may include global positioning system (GPS) coordinates, zip-code information, area-code information, street address information, and/or various other generally known types of geo-location information. In one example, the geo-location information may be directly entered into the devices 120, 150 by a user via a user input component, such as a keyboard, touch display, and/or voice recognition microphone. In another example, the geo-location information may be automatically obtained and/or provided by the devices 120, 150 via an internal or external GPS monitoring component. In other embodiments, the geo-location can be automatically obtained without the use of GPS. In some instances, cell signals or wireless signals are used. This helps to save battery life and to allow for better indoor location where GPS typically does not work.

In one aspect, when interfacing with the devices 120, 150, the requestor 102 and lender 104 may elect to provide or may be prompted to provide permission for the release of geo-location information. Accordingly, the requestor 102 and lender 104 may have exclusive authority to allow transmission of geo-location information from the devices 120, 150 to the service provider server 180. In any instance, the service provider server 180 may communicate with the devices 120, 150 via the network 160 and request permission to acquire geo-location information from the devices 120, 150 for geo-location based commerce.

The service provider server 180, in one embodiment, may be maintained by a transaction processing entity, which may provide processing for financial transactions and/or information transactions between the requestor 102 and lender 104. As such, the service provider server 180 includes a service application 182, which may be adapted to interact with the requestor device 120 and lender device 150 over the network 160. In one example, the service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service provider server 180, in one embodiment, may be configured to maintain one or more user accounts and merchant accounts in an account database 186 each of which may include account information 188 associated with one or more individual users (e.g., requestor 102 and lender 104) and merchants. For example, account information 188 may include private financial information of requestor 102 and lender 104, such as one or more account numbers, passwords, credit card information, banking information, or other types of financial information, which may be used to facilitate financial transactions between requestor 102 and lender 104. In various aspects, the methods and systems described herein may be modified to accommodate users and/or merchants that may or may not be associated with at least one existing user account and/or merchant account, respectively.

In one implementation, the requestor 102 and lender 104 may have identity attributes stored with the service provider server 180, and the requestor 102 and lender 104 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate requestor 102 and lender 104 with one or more particular user accounts maintained by the service provider server 180.

In various embodiments, service provider server 180 includes a crowdsource application 184. The crowdsource application 184 receives a request for cash from the requestor 102, locates lenders (e.g., lender 104) in the vicinity of requestor 104, and broadcasts the request to nearby lenders. When a lender 104 accepts the request, the crowdsource application 184 generates a list of all lenders in the area that are interested in providing funds to the requestor 102. The crowdsource application 184 picks a suitable lender 104, based on a list of criteria. The lender 104 and requestor 102 are matched, and the crowdsource application 184 transmits a message to both parties, which allows them to select a time and location to meet. After the parties meet and cash is exchanged, the requestor 102 can acknowledge the receipt of cash, and the crowdsource application 184 provides a reward, if appropriate, to the lender 104. Service provider server 180 may also process a debit of an account of the requestor 102 for the received cash (plus any fees, charges, or incentives for the lender) and a credit of an account of the lender 104 for the cash provided (plus any rewards or incentives from the requestor).

Figure 2:
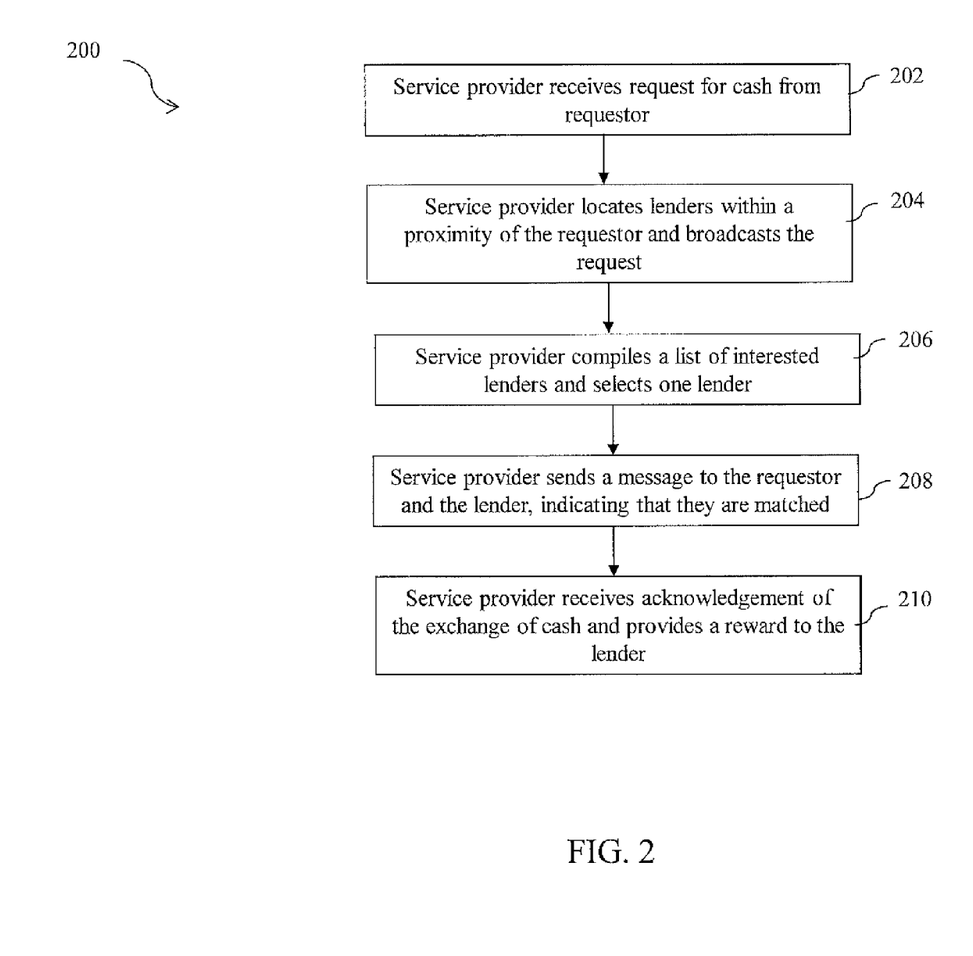
FIG. 2 is a flowchart showing a method for providing cash to a user according to an embodiment of the present disclosure.

Referring now to FIG. 2, a flowchart 200 of a method for providing cash to a user or requestor is illustrated according to an embodiment of the present disclosure. In various embodiments, the requestor 102 and lender 104 register with a service provider, which runs a mobile application. Registration may include signing up for the service and agreeing to any terms required by the service provider, such as through a user device. In one embodiment, the user device is a mobile computing device, such as a smart phone, a PC, or a computing tablet. In other embodiments, registration may be done completely through the user device, partially through the user device, or without using the user device, such as through a phone call or in-person visit to a representative of the payment service provider.

The user may be requested to provider specific information for registration, such as, but not limited to, a name, address, phone number, email address, picture, a user name for the account, and a password or PIN for the account. The type of information may depend on whether the user already has an account with the service provider. Requested information may be entered through the user device or other means, including voice or manual key entry. Once all the requested information is received and confirmed, the service provider may create an account for the user.

In various embodiments, the requestor 102 provides the service provider with their social network contacts. For example, the social network contacts can include contacts in their email address book, friends on Facebook®, connections on LinkedIn®, contacts on Flickr®, followers on Twitter®, and people in the sender's circle in Google+®. The service provider can use the social contacts to determine a suitable lender for the requestor 102.

A requestor 102 is in need of cash and submits a request for cash to the service provider server 180. At step 202, the service provider server 180 receives the request. The request, in various embodiments, includes the amount needed, currency code (e.g., US Dollar, Japanese Yen, Indian Rupee, Singapore Dollar, etc.), and the location of the requestor 102. The request may also include how quickly the cash is needed.

In various embodiments, the service provider server 180 performs a security analysis on requestor 102 to ensure that a lender who provides cash to the requestor 102 is not victimized. The service provider server 180, for instance, can determine the level of trustworthiness or a risk profile of the requestor 102. In one example, the service provider queries third party databases to access criminal records, financial information (e.g., credit history, bankruptcy, etc.), employment records, etc. The service provider server 180 can also examine its own database 186 to determine the reputation of the requestor 102, what kinds of financial transactions the requestor 102 has performed, how often the requestor 102 has used his or her account, the dollar amount on the financial transactions the requestor 102 has performed, the balance in the account of the requestor 102, ratings associated with the requestor 102, etc. The service provider server 180 can determine, after the security analysis, that the cash request from the requestor 102 should not be transmitted because the requestor 102 does not meet a minimum threshold of trustworthiness.

At step 204, the service provider server 180 locates lenders within a predetermined proximity to the requestor 102 and broadcasts the request to these lenders. For example, the service provider determines the location of the requestor 102 and lenders within a particular distance of the requestor 102. The range of distance between the requestor 102 and the lenders may be predetermined by the service provider or the requestor 102. For instance, if the requestor 102 is in a busy, crowded area, the range can be set to be a circle with a small diameter. On the other hand, if the requestor 102 is in a more remote area, the range can be set to encompass a larger area. The range of distance may also vary depending on how quickly the requestor 102 needs the cash. For example, if the requestor 102 needs the cash in fifteen minutes, the distance may be determined such that only lenders that are theoretically able to get to the requestor's location or a common meeting location are identified. There can be certain assumptions, such as whether lenders are in vehicles or have access to vehicles, are on foot, etc.

The request typically includes the amount needed, when the cash is needed, currency requested, and the reward for providing the service. The reward may be set by the requestor 102 or by the service provider server 180. Some lenders are motivated to accept requests by the rewards offered for the transaction. Other lenders may be motivated to help because the requestor 102 is a friend or family member, and as such, no reward may be offered for these lenders.

The reward may be in various forms, such as cash rewards, coupons, vouchers, deals, virtual points, ratings, and bounties. To use the service provided by the service provider, the requestor 102 typically pays a fee, although a fee may be waived or not required in certain situations or cases, including whether the requestor 102 is a loyal or valued customer of the service provider. In some embodiments, a portion of this fee is provided to the lender 104 as the reward. For example, part of the fee received from the requestor 102 can be transferred to the account of the lender as a cash reward. The reward may take the form of coupons, vouchers, and deals that the lender can use at nearby businesses. The deals can be offered in conjunction with and paid for by businesses in the vicinity. Virtual points can be "karma points," which don't have a monetary value, but may be desired by the lender as a social status symbol. Ratings can be provided by the requestor 102 after the transaction. Although the ratings do not have monetary value, they can also act as a social status symbol. The ratings can also be used by the service provider server 180 to select prospective lenders. The requestor 102 may also offer a bounty or premium reward if his or her location is out of the way, the requested cash is a large amount, or if the cash is needed urgently. The bounty serves as an added incentive for lenders to accept the request.

Lenders in the vicinity of the requestor 102 view the request and those who are interested in helping can accept the request. At step 206, the service provider server 180 compiles a list of interested lenders and selects one lender (e.g., lender 104), based on a list of criteria, such as relationship with the requestor 102, distance separating the lender 104 from the requestor 102, rating of the lender 104, amount of cash needed, urgency of the request, etc. The different criteria may be determined and prioritized by the requestor 102 or the service provider server 180. As such, different requestors may have different priorities and be matched with different lenders. For example, the requestor 102 may prioritize the relationship he or she has with the lender 104 over distance so that a friend of the requestor 102 is placed higher on the list than a stranger who is closer.

In one embodiment, interested lenders are ranked and the list is customized for each requestor 102. In some embodiments, the first priority is given to trusted lenders, who are merchants and partners with the service provider. The service provider typically provides them with a setting of "accept all requests in vicinity." These trusted lenders are motivated to accept cash requests to attract more customers to their business. For example, trusted lenders may offer coupons, discounts, or other promotions, in addition to the cash, to the requestor 102. Thus, trusted lenders can advertise their business while providing the requestor 102 with cash. In one embodiment, the trusted lender is not provided a monetary reward for accepting the request because the reward is the connection made with the requestor 102.

Second priority can go to lenders in the social network of the requestor 102. For example, friends, co-workers, and family of the requestor 102 can be given priority after trusted lenders. After social network contacts, priority can go to lenders in the requestor 102's extended social network (e.g., friends of friends). After them, the next in line may be lenders who have conducted a transaction with the requestor 102. Lastly, strangers who are deemed trustworthy by the service provider are sorted based on ratings from previous transactions, account status, and other risk rules. For example, the service provider server 180 can examine its database 186 to determine the reputation of the strangers and review any ratings the strangers received. Priorities can vary and be set by the requestor 102 or the service provider. For example, the requestor 102 may prioritize lenders in the social network of the requestor 102 over trusted lenders of the service provider.

In another embodiment, the service provider broadcasts or sends a message to all qualified lenders that match the criteria of the requestor 102 and/or the service provider. The message may include a general location of the requestor 102 or an exchange spot, an amount of the cash request, an identity of the requestor 102 if the service provider determines that the requestor 102 and the lenders are friends or know each other, a time the cash is needed, any incentives, and any notes about the request. Notes can be information from the requestor 102, such as I need money for gas. Incentives contained in the message may be specific to the individual requestor 102, e.g., family and friends of the requestor 102 are not provided monetary incentives, while trusted lenders who do not know the requestor 102 are provided incentives, which may vary depending on the amount of cash requested, the distance from the requestor 102, etc. Exchange spots can be locations where the requestor 102 needs money, such as at a gas station, or other specific location designated by the requestor 102. The service provider then processes responses from lender(s) who have expressed interest in providing cash to the requestor 102. This can be through a simple button or text response from the lender device 150. The service provider can then determine the "best" lender, such as based on the priority levels of different types of potential lenders, discussed above.

At step 208, the service provider server 180 sends a message to the requestor 102 and the lender 104, indicating that they are matched. The requestor 102 and lender 104 can then select a location and time to exchange the cash. In various embodiments, the service provider server 180 displays the location of the requestor 102 to the lender 104 and/or the location of the lender 104 to the requestor 102 on a map. In some embodiments, the server 180 suggests public locations for the requestor 102 and lender 104. Suitable public locations include parks, gas stations, restaurants, malls, shops, etc.

Once the exchange occurs, the requestor 102 acknowledges receipt of the cash. For example, the requestor 102 can click on a button on a mobile application provided by the service provider. In certain embodiments, the acknowledgement may need to work in the absence of a network for the requestor 102, lender 104, or both. In these cases, assuming that at least one party has access to a network, the acknowledgement is transferred to the party with the network and passed to the service provider server 180 using, for example, Bluetooth low energy, Quick Response (QR) codes, or WiFi Direct. In the complete absence of a network, the acknowledgement can be lined up and sent to the service provider server 180 when a network is available to either the requestor 102 or the lender 104.

At step 210, the service provider server 180 receives the acknowledgement that the funds have been received and provides the reward to the lender 104. For example, the reward can be transferred to the lender 104 account with the service provider.

In some embodiments, the requestor 102 and lender 104 are invited to rate each other after the transaction. The requestor 102 can rate the lender 104 on responsiveness, timeliness, friendliness, etc. The lender 104 can rate the requestor 102 on trustworthiness, friendliness, etc. These ratings can be compiled, stored, and used by the service provider server 180 in future transactions to match requestors with lenders.

The service provider can mediate any disputes raised by either the requestor 102 or the lender 104. The service provider typically considers the current standing, reputation, and risk profiles of both parties in resolving the dispute.

The present methods and systems make a social connection between people asking for help and people willing to help to facilitate a conversion of virtual cash to physical cash. The service provider attempts to match requests based on the distance between the requestor and the lender, and in some embodiments, ranks interested lenders based on certain criteria. Advantageously, travelers do not need to bring a lot of cash when they travel abroad and can rely on lenders to provide the funds needed.

Figure 3:
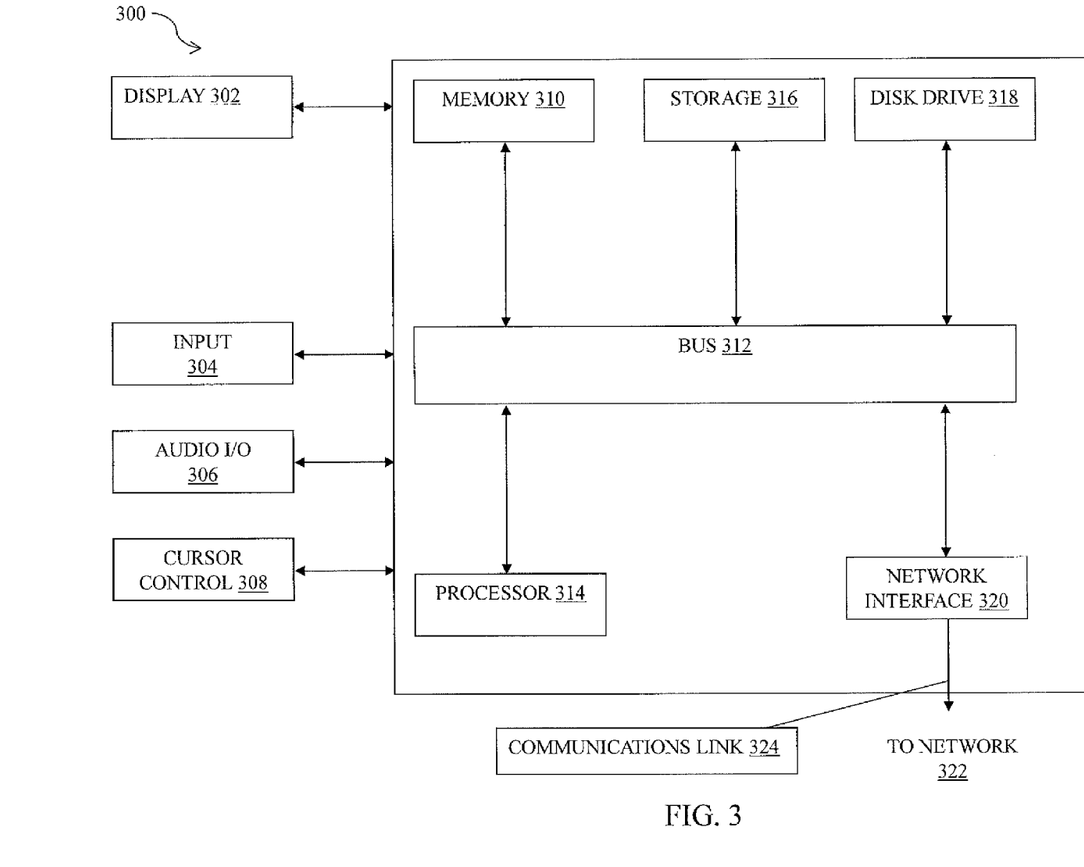
FIG. 3 is a block diagram of a system for implementing a device according to an embodiment of the present disclosure.

FIG. 3 is a block diagram of a computer system 300 suitable for implementing one or more embodiments of the present disclosure, including the requestor device 120, the lender device 150, and the service provider server 180. In various implementations, the requestor device 120 and lender device 150 may comprise a mobile cellular phone, personal computer (PC), laptop, wearable computing device, etc. adapted for wireless communication, and the service provider server 180 may comprise a network computing device, such as a server. Thus, it should be appreciated that the devices 120, 150, and 180 may be implemented as computer system 300 in a manner as follows.

Computer system 300 includes a bus 312 or other communication mechanism for communicating information data, signals, and information between various components of computer system 300. Components include an input/output (I/O) component 304 that processes a user (i.e., sender, recipient, service provider) action, such as selecting keys from a keypad/keyboard, selecting one or more buttons or links, etc., and sends a corresponding signal to bus 312. I/O component 304 may also include an output component, such as a display 302 and a cursor control 308 (such as a keyboard, keypad, mouse, etc.). An optional audio input/output component 306 may also be included to allow a user to use voice for inputting information by converting audio signals. Audio I/O component 306 may allow the user to hear audio. A transceiver or network interface 320 transmits and receives signals between computer system 300 and other devices, such as another user device, a merchant server, or a service provider server via network 322. In one embodiment, the transmission is wireless, although other transmission mediums and methods may also be suitable. A processor 314, which can be a micro-controller, digital signal processor (DSP), or other processing component, processes these various signals, such as for display on computer system 300 or transmission to other devices via a communication link 324. Processor 314 may also control transmission of information, such as cookies or IP addresses, to other devices.

Components of computer system 300 also include a system memory component 310 (e.g., RAM), a static storage component 316 (e.g., ROM), and/or a disk drive 318. Computer system 300 performs specific operations by processor 314 and other components by executing one or more sequences of instructions contained in system memory component 310. Logic may be encoded in a computer readable medium, which may refer to any medium that participates in providing instructions to processor 314 for execution. Such a medium may take many forms, including but not limited to, non-volatile media, volatile media, and transmission media. In various implementations, non-volatile media includes optical or magnetic disks, volatile media includes dynamic memory, such as system memory component 310, and transmission media includes coaxial cables, copper wire, and fiber optics, including wires that comprise bus 312. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 324 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system comprising:
a non-transitory memory; and
one or more hardware processors coupled to the non-transitory memory and configured to read instructions from the non-transitory memory to cause the system to perform operations comprising:
receiving, via a network, a request for cash from a first mobile device associated with a requestor, wherein the request for cash comprises a time when the cash is needed and data for identifying the requestor;
determining a first physical location of the first mobile device;
in response to receiving the request, determining physical locations and moving speeds for a plurality of mobile devices based on geo-location data obtained from geo-location components of the plurality of mobile devices;
determining a subset of mobile devices from the plurality of mobile devices based on (i) the time indicated in the request and (ii) the physical locations and the moving speeds determined for the plurality of mobile devices in relation to the determined first physical location of the first mobile device;
in response to determining the subset of mobile devices, transmitting, via the network, a modified request to only the subset of mobile devices, wherein the modified request is free of data that indicates the identity of the requestor;
modifying predetermined lender ranking criteria associated with the requestor based on the time of the request;
determining, from one or more of the subset of mobile devices that responded to the transmitted request, a second mobile device associated with a lender by applying the modified predetermined lender ranking criteria to the one or more mobile devices;
in response to determining the second mobile device associated with the lender, transmitting, by the one or more hardware processors, a message to the first mobile device and the second mobile device indicating that they have been matched;
identifying a meeting location for completing a cash transaction;
causing at least one of the first mobile device or the second mobile device to display a map including directions to the meeting location; and
in response to receiving an acknowledgement of the completed cash transaction in a cash amount related to the request between the requestor and the lender, crediting the cash amount to a funding account associated with the lender and debiting the cash amount from a funding account associated with the requestor.

2. The system of claim 1, wherein the request further comprises the cash amount, a type of currency, and a reward.

3. The system of claim 2, wherein the reward comprises one or more of cash, a coupon, a voucher, a deal, virtual points, ratings, or a bounty.

4. The system of claim 1, wherein the request further comprises a location description of the requestor that is more general than the first physical location of the first mobile device, an identity of the requestor, and a reward that depends on a relationship between the requestor and a potential lender.

5. The system of claim 1, wherein the operations further comprise:
analyzing characteristics of the first physical location of the first mobile device; and
modifying the predetermined lender ranking criteria of the requestor based on the analyzed characteristics.

6. The system of claim 5, wherein analyzing the characteristics comprises determining a population density level of the first physical location of the first mobile device.

7. The system of claim 5, wherein identifying the meeting location is based on the analyzed characteristics of the first physical location of the first mobile device.

8. A method comprising:
receiving, by one or more hardware processors of a service provider via a network, a request for cash from a first mobile device associated with a requestor, wherein the request for cash comprises a time when the cash is needed and data for identifying the requestor;
determining, by the one or more hardware processors, a first physical location of the first mobile device;
in response to receiving the request, determining physical locations and moving speeds for a plurality of mobile devices based on geo-location data obtained from geo-location components of the plurality of mobile devices;
determining, by the one or more hardware processors, a subset of mobile devices from the plurality of mobile devices based on (i) the time indicated in the request and (ii) the physical locations and the moving speeds determined for the plurality of mobile devices in relation to the determined first physical location of the first mobile device;
in response to determining the subset of mobile devices, transmitting, by the one or more hardware processors via the network, a modified request to only the subset of mobile devices, wherein the modified request is free of data that indicates the identity of the requestor;
modifying, by the one or more hardware processors, predetermined lender ranking criteria associated with the requestor based on the time of the request;
determining, by the one or more hardware processors, one or more of the subset of mobile devices that responded to the transmitted request, a second mobile device associated with a lender by applying the modified predetermined lender ranking criteria to the one or more mobile devices;
in response to determining the second mobile device associated with the lender, transmitting, by the one or more hardware processors, a message to the first mobile device and the second mobile device indicating that they have been matched;
identifying, by the one or more hardware processors, a meeting location for completing a cash transaction corresponding to the request;
causing, by the one or more hardware processors, at least one of the first mobile device or the second mobile device to display a map including directions to the meeting location; and
in response to receiving an acknowledgement of the completed cash transaction in a cash amount related to the request between the requestor and the lender, crediting, by the one or more hardware processors, the cash amount to a funding account associated with the lender and debiting, by the one or more hardware processors, the cash amount from a funding account associated with the requestor.

9. The method of claim 8, wherein the lender is one of a merchant who is partnered with the service provider, a person within an online social network of the requestor, a person who have conducted a financial transaction with the requestor, or a stranger deemed trustworthy by the service provider.

10. The method of claim 8, wherein the request further comprises the cash amount, a type of currency, and a reward.

11. The method of claim 8, wherein the request further comprises a location description of the requestor that is more general than the first physical location of the first mobile device, an identity of the requestor, and a reward that depends on a relationship between the requestor and a potential lender.

12. The method of claim 8, further comprising:
   analyzing, by the one or more hardware processors, characteristics of the first physical location of the first mobile device; and
   modifying, by the one or more hardware processors, the predetermined criteria of the requestor based on analyzed characteristics.

13. The method of claim 8, wherein determining the subset of mobile devices comprises estimating a time within which each mobile device in the plurality of mobile devices is able to arrive at the first physical location of the first mobile device based on the physical locations and the moving speeds determined for the plurality of the mobile devices.

14. A non-transitory machine-readable medium having stored thereon machine-readable instructions executable to cause a machine to perform operations comprising:
   receiving, via a network, a request for cash from a first mobile device associated with a requestor, wherein the request for cash comprises a time when the cash is needed and data for identifying the requestor;
   determining a first physical location of the first mobile device;
   in response to receiving the request, determining physical locations and moving speeds for a plurality of mobile devices based on geo-location data obtained from geo-location components of the plurality of mobile devices;
   determining a subset of mobile devices from the plurality of mobile devices based on (i) the time indicated in the request and (ii) the physical locations and the moving speeds determined for the plurality of mobile devices in relation to the determined first physical location of the first mobile device;
   in response to determining the subset of mobile devices, transmitting, via the network, a modified request to only the subset of mobile devices, wherein the modified request is free of data that indicates the identity of the requestor;
   modifying predetermined lender ranking criteria associated with the requestor based on the time of the request;
   determining, from one or more of the subset of mobile devices that responded to the transmitted request, a second mobile device associated with a lender by applying the modified predetermined lender ranking criteria to the one or more mobile devices;
   in response to determining the second mobile device, transmitting, by the one or more hardware processors, a message to the first mobile device and the second mobile device indicating that they have been matched;
   identifying a meeting location for completing the cash transaction corresponding to the request;
   causing at least one of the first mobile device or the second mobile device to display a map including directions to the meeting location; and
   in response to receiving an acknowledgement of the completed cash transaction in a cash amount related to the request between the requestor and the lender, crediting the cash amount to a funding account associated with the lender and debiting the cash amount from a funding account associated with the requestor.

15. The non-transitory machine-readable medium of claim 14, wherein the operations further comprise:
   analyzing characteristics of the first physical location of the first mobile device; and
   modifying the predetermined lender ranking criteria of the requestor based on the analyzed characteristics.

16. The non-transitory machine-readable medium of claim 14, wherein the operations further comprise receiving the acknowledgement that the cash amount was received by the requestor from the first mobile device via the network.

17. The non-transitory machine-readable medium of claim 16, wherein the operations further comprise, after receiving the acknowledgement, providing a reward to the lender.

18. The non-transitory machine-readable medium of claim 17, wherein providing the reward comprises debiting the reward from the funding account associated with the requestor and crediting the reward to the funding account associated with the lender.

19. The non-transitory machine-readable medium of claim 14, wherein the operations further comprise receiving a rating of the requestor from the second mobile device, a rating of the lender from the first mobile device, or both.

20. The non-transitory machine-readable medium of claim 19, wherein the operations further comprise using at least one rating in a future transaction associated with a request for cash.

* * * * *